US005932282A

United States Patent [19]

Diener et al.

[11] Patent Number: 5,932,282

[45] Date of Patent: Aug. 3, 1999

[54] PROCESS FOR PRODUCING A REPAIR COATING

[75] Inventors: Wolfgang Diener; Peter Klostermann; Frank-Jürgen Krumpolt, all of Wuppertal; Christine Kurz, Solingen; Karin Maag, Wuppertal; Hans-Ulrich Simmrock, Wuppertal; Werner Lenhard, Wuppertal, all of Germany

[73] Assignee: Herberts Gesellschaft mit beschrankter Haftung, Germany

[21] Appl. No.: 08/920,429

[22] Filed: Aug. 29, 1997

[30] Foreign Application Priority Data

Aug. 31, 1996 [DE] Germany ........................... 196 35 477

[51] Int. Cl.[6] ................................ B05D 3/06; C08F 2/48

[52] U.S. Cl. .......................... 427/140; 427/142; 427/558; 427/492; 427/407.1

[58] Field of Search .................................... 427/140, 142, 427/407.1, 492, 558, 559, 595, 386, 385.5, 410

[56] References Cited

U.S. PATENT DOCUMENTS

| | | | |
|---|---|---|---|
| 3,511,687 | 5/1970 | Keyl et al. . | |
| 3,669,716 | 6/1972 | Keyl et al. . | |
| 3,930,064 | 12/1975 | Sander | 427/492 |
| 3,943,046 | 3/1976 | De Sorga et al. | 427/492 |
| 4,089,815 | 5/1978 | Reiter et al. | 260/2 R |
| 4,212,901 | 7/1980 | Van Neerbos et al. | 427/475 |
| 4,287,228 | 9/1981 | Schlesinger | 427/514 |
| 4,347,111 | 8/1982 | Gehlhaus et al. | 204/159.16 |
| 4,672,079 | 6/1987 | Li Bassi et al. | 522/35 |
| 5,225,170 | 7/1993 | Kolk et al. | 427/492 |
| 5,276,097 | 1/1994 | Hoffman et al. | 525/167 |
| 5,416,136 | 5/1995 | Konzmann et al. | 523/414 |
| 5,480,680 | 1/1996 | Vieyra | 427/140 |
| 5,714,208 | 2/1998 | Ferrell et al. | 427/140 |

FOREIGN PATENT DOCUMENTS

| | | |
|---|---|---|
| 0 000 407 | 1/1979 | European Pat. Off. . |
| 0 003 002 | 7/1979 | European Pat. Off. . |
| 0 525 340 | 2/1993 | European Pat. Off. . |
| 1 571 175 | 3/1971 | Germany . |
| 41 33 290 | 4/1993 | Germany . |
| 2 177 093 | 1/1987 | United Kingdom . |
| WO 94/11123 | 5/1994 | WIPO . |

*Primary Examiner*—Diana Dudash
*Attorney, Agent, or Firm*—Merchant, Gould, Smith, Edell, Welter & Schmidt, P.A.

[57] ABSTRACT

A process for producing a repair coating This invention relates to a process for producing a multi-layer repair coating by the application of a transparent clear lacquer coat, which is unpigmented or which contains colourless pigment, to a predried or hardened colour- and/or effect-imparting base pigment coat, or by the application of a pigmented covering lacquer coat to an optionally precoated substrate. Binder vehicles which are hardenable exclusively by radical polymerisation are used for the production of the transparent clear lacquer coat or of the pigmented covering lacquer coat, and hardening is effected by means of pulsed, high-energy UV radiation.

10 Claims, No Drawings

PROCESS FOR PRODUCING A REPAIR COATING

This invention relates to a process for producing a multi-layer repair coating which is employed in particular in the field of coating vehicles and vehicle parts. The process is particularly suitable for repairing bodywork parts and smaller areas of damage.

In the coating of vehicles for repair purposes, e.g. in a paint shop, bodywork parts and smaller areas of damage generally have to be repaired in addition to the coating of complete bodies. Drying or hardening of the coated vehicles or vehicle parts can either be effected at room temperature overnight or can be effected in a shorter time by forced drying or hardening, for example for 30 minutes at 60° C. in a booth. For the repair of bodywork parts and smaller damaged areas it is scarcely productive for a paint shop to dry the entire vehicle in a drying booth or to take up floor space in the paint shop by drying at room temperature overnight. IR radiators are usually employed in such cases in order to effect forced drying. A procedure is employed, for example, in which a clear lacquer is applied wet-into-wet to a base lacquer, after a brief ventilation period, and both coats are hardened within about 20–25 minutes by means of one or more IR radiators. However, it is precisely for the repair coating of bodywork parts and smaller damaged areas that there is a need to shorten the requisite drying or hardening times further, for reasons of efficiency.

It is known that a high-energy electronic flash device can be used as a radiation source for drying and hardening lacquers, adhesives, etc., which can be hardened by the action of radiation. WO-A-94/11123 describes a related process, which is suitable for the hardening or drying of liquid stopper compositions, thick films, protective coats on optical surfaces and for the drying of anti-impact coats.

DE-A-15 71 175 describes a process for hardening an air-drying, unsaturated polyester resin coat which is employed for the coating of wood. Hardening is effected here using photoflashes from a gas-filled electrical flash tube.

Nothing is stated in either of the above publications concerning the possibility and the conditions of use of flash devices for the coating of automobiles for repair purposes.

DE-A41 33 290 describes a process for producing a multi-layer coating for the mass production coating of motor vehicles, in which a coating medium which can be hardened by means of radiation is used as a clear lacquer and the coating medium is applied using illumination with light of wavelength greater than 550 nm or with the exclusion of light, and hardening is effected by means of high-energy radiation. In this process, the clear lacquer is applied to a substrate which has been coated with a cathodic electro-dip primer, a primer surfacer and a base lacquer and which has been stored at 120–140° C., and is subsequently irradiated.

EP-A-0 000 407 describes a radiation-hardenable coating medium which is based on an OH-functional polyester resin esterified with acrylic acid, a vinyl compound, a photoinitiator and a polyisocyanate. Radiation hardening by means of UV light is effected in a first hardening step, and the final hardness is imparted to the coating by OH/NCO crosslinking in a second hardening step. The second hardening step can be effected at 130–200° C. or over several days at room temperature.

The object of the present invention was to provide a process for producing a multi-layer repair coating, particularly for the repair coating of vehicle parts and for repairing smaller damaged areas, which reduces the drying times which were customary hitherto and which results in coatings which, despite their reduced drying times, satisfy the requirements which are imposed on a repair coating, particularly as regards hardness, scratch-resistance and elasticity, without loss of quality.

This object is achieved by a process for producing a multi-layer repair coating by the application of a transparent clear lacquer coat, which is unpigmented or which contains colourless pigment, to a predried or hardened colouring and/or effect-imparting base pigment coat, or by the application of a pigmented covering lacquer coat to an optionally precoated substrate, characterised in that binder vehicles which are hardenable exclusively by radical and/or cationic polymerisation are used for the production of the transparent clear lacquer coat or of the pigmented covering lacquer coat, and hardening is effected by means of pulsed, high-energy UV radiation.

The high-energy pulsed UV radiation which is used for hardening the transparent clear lacquer coat or the pigmented covering lacquer coat can be produced, for example, using a radiation source which comprises a high-energy electronic flash device, hereinafter called a UV photoflash lamp. With this radiation source it is possible completely to harden the coatings within seconds.

It was surprising, and could not have been deduced from the prior art, that the multi-layer structures obtained by the process according to the invention exhibit the same level of properties required for a repair coating as do multi-layer coatings which are dried or hardened under customary repair conditions. For the coating of vehicles for repair purposes, a base lacquer is usually applied to a substrate, which is optionally precoated with primer and/or primer surfacer, and a clear lacquer is applied wet-into-wet thereto, optionally after a brief period of ventilation. Both coats are subsequently hardened at room temperature overnight or within 20–80 minutes at 40–80° C. In the process according to the invention, the base lacquer which is applied is preferably only dried for a short time, and the clear lacquer is then applied and exposed to radiation. Due to the irradiation with said UV photoflash lamp, the clear lacquer is completely hardened within seconds, whilst in principle the base lacquer is only subjected to a kind of pre-drying. The UV irradiation essentially makes no further contribution to the hardening of the base lacquer. It could not have been anticipated that multi-layer structures produced in this manner would exhibit a very good hardness and scratch-resistance in particular, as well as a high elasticity, like those which are otherwise obtained in a multi-layer structure produced under customary repair conditions comprising considerably longer times of drying or hardening.

Radiation-hardening of the clear lacquer or of the pigmented covering lacquer is effected according to the invention with pulsed high-energy UV radiation. One or more UV photoflash lamps are preferably used as the radiation source for this purpose. These UV photoflash lamps emit light having a wavelength of 200–900 nm, with a maximum at 500 nm. The photoflashes may be triggered every 4 seconds, for example. The UV photoflash lamps preferably contain a plurality of flash tubes, for example quartz tubes filled with an inert gas such as xenon. The UV photoflash lamps should produce an illumination of at least 10 megalux, preferably 10–80 megalux, per flash discharge at the surface of the coating to be hardened. The electrical energy per flash discharge should preferably be 1–10 kJoules. The UV photoflash lamp is preferably a transportable device which can be positioned directly in front of the damaged area to be repaired. Examples of UV photoflash lamps which can be used are described in WO-A-9411123 and in EP-A-0 525 340.

UV photoflash lamps are commercially obtainable.

The transparent clear lacquers or pigmented covering lacquers which can be used in the process according to the invention are radiation-hardenable coating media which crosslink exclusively via a radical and/or a cationic polymerisation. These may be aqueous systems of high solids contents which exist as emulsions, or the systems may also exist in a form containing solvent. However, they are preferably 100% lacquer systems which can be applied without solvent and without water.

All customary radiation-hardenable binder vehicles or mixtures thereof which are known to one skilled in the art and which are described in the literature can be used as radiation-hardenable binder vehicles in the process according to the invention. These are binder vehicles which can be crosslinked either by radical polymerisation or by cationic polymerisation. In the former, the effect of high-energy radiation on the binder vehicles or coating media generates radicals which then initiate the crosslinking reaction. In systems which harden by an anionic mechanism, Lewis acids are formed from initiators by the radiation, and these Lewis acids then initiate the crosslinking reaction.

Examples of binder vehicles which harden by a radical mechanism are prepolymers, such as polymers or oligomers, which contain olefinic double bonds in their molecule. Examples of prepolymers or oligomers include (meth)acrylic-functional (meth)acrylic copolymers, epoxy resin (meth)acrylates, polyester (meth)acrylates, polyether (meth)acrylates, polyurethane (meth)acrylates, unsaturated polyesters, amino(meth)acrylates, melamine (meth)acrylates, unsaturated polyurethanes or silicone (meth)acrylates. The molecular weight (Mn) of these compounds is preferably 200 to 10,000. Aliphatic and/or cycloaliphatic (meth)acrylates are preferably used in each case. (Cyclo)aliphatic Polyurethane (meth)acrylates and polyester (meth)acrylates are particularly preferred. The binder vehicles can be used individually or in admixture.

The prepolymers may optionally be present dissolved in what are termed reactive thinners, i.e. in reactive, liquid monomers. These reactive thinners are generally used in amounts of 1–50% by weight, preferably 5–30% by weight, with respect to the total weight of prepolymer and reactive thinner. The reactive thinners may be mono-, di- or polyunsaturated. Examples of mono-unsaturated reactive thinners include: (meth)acrylic acid and esters thereof, maleic acid and semi-esters thereof, vinyl acetate, vinyl ethers, substituted vinyl ureas, styrene and vinyltoluene. Examples of di-unsaturated reactive thinners include: di(meth)acrylates such as alkylene glycol di(meth)acrylate, polyethylene glycol di(meth)acrylate, 1,3-butanediol di(meth)acrylate, vinyl (meth)acrylate, allyl (meth)acrylate, divinyl benzene, dipropylene glycol di(meth)acrylate and hexanediol di(meth)acrylate. Examples of polyunsaturated reactive thinners include: glycerol tri(meth)acrylate, trimethylolpropane tri(meth)acrylate, pentaerythritol tri(meth)acrylate and pentaerythritol tetra(meth)acrylate. The reactive thinners can be used individually or in admixture. Diacrylates such as dipropylene glycol diacrylate, tripropylene glycol diacrylate and/or hexanediol diacrylate are preferably used as reactive thinners.

The coating media which can be hardened by a radical mechanism contain photoinitiators. Examples of suitable photoinitiators are those which absorb in the wavelength range from 190 to 400 nm. Examples of initiators for radical polymerisation include aromatic compounds which contain chlorine, e.g. those described in US-A-4 089 815, aromatic ketones such as those described in EP-A-0 003 002 and EP-A-0 161 463, and hydroxyalkylphenones such as those described in US-A-4 347 111. Alkyl- or arylphosphine oxides, hydroxyacetophenone derivatives and benzophenone derivatives are particularly suitable. The photoinitiators can be added, for example, in amounts of 0.1–5% by weight, preferably 0.5–3% by weight, with respect to the sum of prepolymers which can be polymerised by a radical mechanism, reactive thinners and initiators. They can be used individually or in admixture.

The usual binder vehicles which are known to one skilled in the art and which are described in the literature can be used as binder vehicles for cationically polymerisable systems. These may include polyfunctional epoxy oligomers which contain more than two epoxy groups in their molecule, for example. It is advantageous if the binder vehicles are free from aromatic structures. Epoxy oligomers such as these are described in DE-A-36 15 790, for example. Examples thereof include polyalkylene glycol diglycidyl ethers, hydrogenated bisphenol A glycidyl ethers, epoxyurethane resins, glycerol triglycidyl ethers, diglycidyl hexahydrophthalate, diglycidyl esters of dimeric acids, epoxidised derivatives of (meth)cyclohexene, such as 3,4-epoxycyclohexyl-methyl(3,4-epoxycyclohexane) carboxylate or epoxidised polybutadiene for example. The number average molecular weight of these polyepoxide compounds is preferably less than 10,000. Reactive thinners may also be used, such as cyclohexene oxide, butene oxide, butanediol diglycidyl ether or hexanediol diglycidyl ether for example.

Photoinitiators for systems which harden cationically are substances which are known as onium salts and which release Lewis acids under the action of radiation. Examples thereof include diazonium salts, sulphonium salts or iodonium salts. Triarylsulphonium salts are preferred. The photoinitiators may be used individually or in admixture, in amounts of 0.5 to 5% by weight with respect to the sum of cationically polymerisable prepolymers, reactive thinners and initiators.

The transparent clear lacquers and pigmented covering lacquers which are used in the process according to the invention may contain additives. These additives are the customary additives which can be used in the lacquer sector. Examples of additives such as these include flow enhancers, e.g. those based on (meth)acrylic homopolymers or silicone oils, rheology-influencing agents such as microdispersed hydrated silica or polymeric urea compounds, thickeners such as crosslinked polycarboxylic acid or polyurethanes, anti-foaming agents, wetting agents, and elasticity-imparting agents. Light stabilisers are preferably added. Examples of light stabilisers include phenyl salicylates, benztriazole and derivatives thereof, HALS compounds, and oxalanilide derivatives. The additives are used in customary amounts familiar to one skilled in the art.

The transparent clear lacquers and pigmented covering lacquers used in the content according to the invention may contain organic solvents and/or water. The solvents are the customary lacquer technology solvents. These may originate from the production of the binder vehicle or may be added separately. Examples of solvents such as these include mono- or polyhydric alcohols e.g. propanol, butanol, hexanol; glycol ethers or esters e.g. diethylene glycol dialkyl ethers, dipropylene glycol dialkyl ethers, each containing a C1to C6 alkyl, ethoxypropanol, butyl glycol; glycols e.g. ethylene glycol, propylene glycol and oligomers thereof, N-methylpyrrolidone, and ketones e.g. methyl ethyl ketone, acetone or cyclohexanone; aromatic or aliphatic hydrocarbons e.g. toluene, xylene or linear or branched aliphatic C6-C12 hydrocarbons.

The clear lacquers which can be used according to the invention may contain transparent pigments, such as silica for example, and may optionally also contain soluble colorants. The pigmented covering lacquers which can be used according to the invention contain colour- and/or effect-imparting pigments. All customary lacquer pigments of an organic or inorganic nature are suitable as pigments. Examples of inorganic or organic colouring pigments include titanium dioxide, micronised titanium dioxide, iron oxide pigments, carbon black, azo pigments, phthalocyanine pigments, and quinacridone and pyrrolopyrrole pigments. Examples of effect-imparting pigments include metallic pigments, e.g. aluminium pigments, and pearl gloss pigments.

Different systems which harden by a radical mechanism, different cationically hardenable systems, or systems which harden by a radical mechanism and cationically hardenable systems can be combined with each other for the production of the radiation-hardenable coating media. Systems which harden by a radical mechanism are preferably used.

The radiation-hardenable coating media can be applied in the known manner, for example by spray application. The transparent clear lacquers may be applied over customary aqueous or solvent-based base lacquers.

Customary base lacquers which contain physically drying or chemically crosslinking binder vehicles can be used as base lacquers. The base lacquers contain organic and/or inorganic colour- and/or effect-imparting pigments and/or extenders, water and/or organic solvents, and optionally also contain customary lacquer additives. The base lacquers are applied to substrates which may be precoated with customary primer, primer surfacer and intermediate coats, such as those which are used for multi-layer coating in the motor vehicle sector. The preferred substrates are metal or plastics parts.

Drying or hardening of the base lacquer coat can be effected at room temperature or at elevated temperature. Drying may preferably be effected over a few minutes, e.g. 3–10 minutes, at 40–80° C. Drying of the base lacquer coat is most preferably effected by means of infrared radiation. IR drying can be effected within 3–6 minutes, for example.

Drying of the base lacquer is followed by application of the clear lacquer, preferably to give a resulting dry film coat thickness of 20–80 $\mu$m, most preferably of 20–50 $\mu$m.

If a pigmented covering lacquer is used as the radiation-hardenable coating medium, this may be applied, for example, over customary solvent- or water-based primer surfacers, primers or intermediate coats. These primer surfacer, primer or intermediate coats may already have been hardened or predried.

The clear lacquer in the multi-layer repair coating is preferably formulated as a radiation-hardenable coating medium, however.

Application of the clear lacquer or of the pigmented covering lacquer is followed by crosslinking by means of UV radiation. The UV photoflash lamps described above are employed as the source of UV radiation. Drying or hardening of the coatings can be effected by a multiplicity of successive flash discharges. 1 to 40 successive flash discharges are preferably triggered. The distance of the UV photoflash lamp from the substrate surface to be irradiated may be 5–50 cm, preferably 10–25 cm, most preferably 15–20 cm. Screening of the UV lamps to prevent the emergence of radiation can be effected, for example, by the use of an appropriately lined protective housing round the transportable lamp unit, or by means of other safety measures which are known to one skilled in the art.

The duration of irradiation as a whole falls within the range of a few seconds, for example within the range from 1 millisecond to 400 seconds, preferably 4–160 seconds, depending on the number of flash discharges selected.

The process according to the invention results in multi-layer coatings which have a high hardness, a high scratch-resistance and high gloss, as well as very good elasticity. The clear lacquer exhibits very good adhesion to the base lacquer and very good resistance to detachment in relation to the base lacquer. The coatings correspond to the requirements imposed on a repair lacquer structure in the vehicle coating field. Drying or hardening of the coatings, particularly those with a base lacquer/clear lacquer structure, takes place in an extremely short time compared with repair lacquer structures which are dried or hardened in the usual manner. For example, it is possible to complete the entire drying or hardening process, including the predrying of the base lacquer, within 5–15 minutes, preferably 5–10 minutes.

The process according to the invention is particularly suitable for the repair coating of smaller bodywork parts or of smaller damaged areas, but can also be used for the repair coating of larger parts, for example larger vehicle parts.

The invention will be explained with reference to the following examples.

Production of clear lacquers

The following components were mixed in the given sequence and were homogenised for a few minutes by means of a high-speed stirrer (all data in % by weight). Commercially available binder vehicles were used.

Binder vehicle 1 (BV 1): a commercially available urethane diacrylate

Binder vehicle 2 (BV 2): a commercially available polyester acrylate

Binder vehicle 3 (BV 3): a commercially available multifunctional melamine acrylate.

TABLE 1

| | System 1 | System 2 | System 3 |
|---|---|---|---|
| BV 1 | 63.1 | | |
| BV 2 | | 47.2 | |
| BV 3 | | | 47.2 |
| hexanediol diacrylate | 31.3 | 47.2 | 47.2 |
| commercially available photoinitiator based on phenylphosphine oxide | 1.5 | 1.5 | 1.5 |
| commercially available photoinitiator based on an acetophenone derivative | 1.5 | 1.5 | 1.5 |
| commercially available light stabiliser (HALS type) | 1.6 | 1.6 | 1.6 |
| commercially available UV absorber (benztriazole type) | 1.0 | 1.0 | 1.0 |
| pendulum hardness (sec) | 80 | 74 | 73 |
| Erichsen cupping index (mm) | 4.1 | 3.7 | 3.5 |

The use of different reactive thinners:

Sartomer 610: polyethylene glycol 600 diacrylate

Craynor CN 435: polyether triacrylate

TABLE 2

| | System 4 | System 5 | System 6 |
|---|---|---|---|
| BV 1 | 27.55 | 27.55 | 27.55 |
| Craynor ®CN 435 | 69.44 | | |
| Sartomer ®610 | | 69.44 | |
| hexanediol diacrylate | | | 69.44 |
| commercially available photoinitiator based on phenylphosphine oxide | 1.55 | 1.55 | 1.55 |

TABLE 2-continued

| | System 4 | System 5 | System 6 |
|---|---|---|---|
| commercially available photoinitiator based on an acetophenone derivative | 1.55 | 1.55 | 1.55 |
| König pendulum hardness (sec) | 36 | 48 | 99 |
| Erichsen cupping index (mm) | 4.9 | 7.4 | 1.6 |
| Peters scratch-resistance (20 ° residual gloss in %) | 93 | 99 | 94 |

The pendulum damping test was performed according to DIN 53157 (according to König)

The Erichsen cupping test was performed according to ISO 1520.

Application of the coating media

An aqueous base lacquer (polyurethane-based binder vehicle) was applied to a metal sheet, which had been cathodically electrodipped and coated with a primer surfacer, to give a resulting dry film coat thickness of 13–15 μm. It was dried for 3 minutes using IR radiators.

The clear lacquers corresponding to systems 1–6 were subsequently applied in each case to give a resulting dry film coat thickness of 40–50 μm.

UV hardening was effected by means of a UV photoflash lamp (3500 Ws), using 10 exposures (about 40 sec) at an object distance of 20 cm.

The lacquer technology properties of the coatings obtained in this manner are presented in Tables 1 and 2 above. The hardness, scratch-resistance and elasticity of the coatings essentially satisfied the requirements which are imposed on a multi-layer repair coating.

Comparative application

For comparison, a customary two-component HS automobile clear repair lacquer (acrylate resin/polyisocyanate) was applied wet-into-wet to an aqueous base lacquer (as described above) to give a resulting dry film coat thickness of about 50 μm, and was dried for 5 minutes at 60° C. The drying time thus approximately corresponded to the hardening time which was necessary for the complete hardening of the multi-layer structure in the systems comprising the UV-hardenable clear lacquers (systems 1–6), including the time of predrying of the aqueous base lacquer. For this comparative application, a satisfactory hardness of the multi-layer structure could not be achieved within this comparable time of drying. A tacky surface was obtained, so that further tests for hardness and scratch-resistance were invalidated.

We claim:

1. A process for producing a multi-layer repair coating comprising applying a lacquer topcoat to a dried, but curable colour- and/or effect-imparting base lacquer coat, and radiating the lacquer topcoat with pulsed, high energy UV radiation to produce the hardened repair coating wherein the lacquer topcoat only contains a binder vehicle which is hardenable exclusively by radical polymerisation.

2. A process according to claim 1, wherein a high-energy UV photoflash lamp is used as a source of UV radiation.

3. A process according to claim 1, wherein the UV radiation has a wavelength of 200–900 nm.

4. A process according to claim 1, wherein the illumination is 10–80 megalux per flash discharge.

5. A process according to claim 1, wherein the electrical energy per flash discharge is 1–10 kJoules.

6. A process according to claim 1, wherein 1 to 40 successive flash discharges are used for hardening.

7. A process according to claim 1, wherein the total duration of irradiation is 1 ms to 400 s.

8. A process according to claim 1, wherein the binder vehicle is polyurethane- or polyester methacrylates or aliphatic epoxy oligomers or a combination thereof in mixture with diacrylate monomers or epoxy-functional monomers or a combination thereof as reactive thinners.

9. A process according to claim 1 wherein the lacquer topcoat is clear and unpigmented or contains colorless pigment.

10. A process according to claim 1 wherein the lacquer topcoat is a pigmented covering lacquer coat and the base lacquer coat is a primer coat.

* * * * *